United States Patent
Raja et al.

(10) Patent No.: US 9,639,468 B2
(45) Date of Patent: May 2, 2017

(54) TEMPORAL CLONES TO IDENTIFY VALID ITEMS FROM A SET OF ITEMS

(71) Applicant: Oracle International Corporation, Redwood Shores, CA (US)

(72) Inventors: Vivekanandhan Raja, San Mateo, CA (US); Sanket Hase, Mountain View, CA (US); Amit Ganesh, San Jose, CA (US); Vineet Marwah, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/506,613

(22) Filed: Oct. 4, 2014

(65) Prior Publication Data

US 2016/0098347 A1    Apr. 7, 2016

(51) Int. Cl.
*G06F 12/00* (2006.01)
*G06F 12/0815* (2016.01)
(Continued)

(52) U.S. Cl.
CPC .......... *G06F 12/0815* (2013.01); *G06F 3/064* (2013.01); *G06F 3/0604* (2013.01); *G06F 3/065* (2013.01); *G06F 3/0689* (2013.01); *G06F 12/1018* (2013.01); *G06F 15/78* (2013.01); *G06F 17/30312* (2013.01); *G06F 17/30315* (2013.01); *G06F 17/30377* (2013.01); *G06F 17/30477* (2013.01); *G06F 17/30595* (2013.01);
(Continued)

(58) Field of Classification Search
CPC .......................... G06F 12/0866; G06F 12/0815
See application file for complete search history.

(56) References Cited

U.S. PATENT DOCUMENTS 5,742,792 A    4/1998  Yanai et al.
5,778,430 A    7/1998  Ish et al.
(Continued)

FOREIGN PATENT DOCUMENTS

EP      2 608 070 A1     6/2013
WO    WO2007/078444 A1  7/2007

OTHER PUBLICATIONS

U.S. Appl. No. 14/337,183, filed Jul. 21, 2014, Office Action.
(Continued)

*Primary Examiner* — David X Yi
*Assistant Examiner* — Arvind Talukdar
(74) *Attorney, Agent, or Firm* — Hickman Palermo Becker Bingham LLP (57) ABSTRACT

Techniques are provided for using bitmaps to indicate which items, in a set of items, are invalid. The bitmaps include an "active" bitmap and one or more "temporal clones". The active bitmap indicates which items in the set are currently valid. The temporal clones are outdated versions of the active bitmap that indicate which items in the set were invalid at previously points in time. Temporal clones may not be very different from each other. Therefore, temporal clones may be efficiently compressed. For example, a bitmap may be selected as a "base bitmap", and one or more other bitmaps are encoded using delta encoding. Run length encoding may then be applied to further compress the bitmap information. These bitmaps may then be used to determine which items are valid relative to past-version requests.

20 Claims, 3 Drawing Sheets

(51) Int. Cl.
*G06F 17/30* (2006.01)
*G06F 15/78* (2006.01)
*G06F 12/1018* (2016.01)
*G06F 3/06* (2006.01)

(52) U.S. Cl.
CPC .............. *G06F 2003/0697* (2013.01); *G06F 2212/1021* (2013.01); *G06F 2212/1032* (2013.01); *G06F 2212/2542* (2013.01); *G06F 2212/313* (2013.01)

(56) References Cited

U.S. PATENT DOCUMENTS

| | | | |
|---|---|---|---|
| 6,009,432 | A | 12/1999 | Tarin |
| 7,149,769 | B2 | 12/2006 | Lubbers et al. |
| 8,433,684 | B2 | 4/2013 | Munoz |
| 8,650,156 | B1 * | 2/2014 | McHugh ........... G06F 17/30194 707/638 |
| 8,856,484 | B2 | 10/2014 | Ben-Tsion et al. |
| 9,189,414 | B1 * | 11/2015 | Shim .................. G06F 12/0891 |
| 2005/0055380 | A1 | 3/2005 | Thompson et al. |
| 2008/0059492 | A1 | 3/2008 | Tarin |
| 2008/0256250 | A1 | 10/2008 | Wakefield |
| 2008/0281784 | A1 | 11/2008 | Zane et al. |
| 2008/0281865 | A1 | 11/2008 | Price et al. |
| 2010/0235335 | A1 | 9/2010 | Heman et al. |
| 2010/0250549 | A1 | 9/2010 | Muller et al. |
| 2011/0029569 | A1 | 2/2011 | Ganesh et al. |
| 2011/0107025 | A1 * | 5/2011 | Urkude ............... G06F 11/2094 711/112 |
| 2011/0138123 | A1 | 6/2011 | Aditya et al. |
| 2012/0054225 | A1 * | 3/2012 | Marwah ........... G06F 17/30477 707/769 |
| 2012/0173515 | A1 | 7/2012 | Jeong et al. |
| 2012/0323971 | A1 | 12/2012 | Pasupuleti |
| 2013/0064052 | A1 * | 3/2013 | Mehra ................ G11B 20/1217 369/30.01 |
| 2014/0040218 | A1 | 2/2014 | Kimuira et al. |
| 2014/0075493 | A1 | 3/2014 | Krishnan et al. |
| 2015/0088811 | A1 | 3/2015 | Hase et al. |
| 2015/0088822 | A1 | 3/2015 | Raja et al. |
| 2015/0088824 | A1 | 3/2015 | Kamp et al. |
| 2015/0088830 | A1 | 3/2015 | Kamp et al. |
| 2015/0088926 | A1 | 3/2015 | Chavan et al. |
| 2015/0089125 | A1 | 3/2015 | Mukherjee et al. |
| 2015/0089134 | A1 | 3/2015 | Mukherjee et al. |
| 2015/0134900 | A1 * | 5/2015 | Lin ........................ G06F 17/30 711/113 |

OTHER PUBLICATIONS

U.S. Appl. No. 14/337,183, filed Jul. 21, 2014, Notice of Allowance.
Schaffner et al., "A Hybrid Row-Colomn OLTP Database Architecture for Operational Reporting", Business Intelligence for the real-time Enterprise, dated Aug. 24, 2008, 14 pages.
Ramamurthy, Ravishankar, "A Case for Fractured Mirrors", Proceedings of the 28th VLDB Conference, dated 2002, 12 pages.
Nirmesh, Malviya, "Recovery Algorithms for In-Memory OLTP Databases", Master of Science Thesis, dated Jul. 1, 2012, 66 pages.
Farber et al., "SAP HANA Database—Data Management for Modern Business Applications", SIGMOD Record, dated Dec. 2011, vol. 40, No. 4, 8 pages.

* cited by examiner

TEMPORAL CLONES TO IDENTIFY VALID ITEMS FROM A SET OF ITEMS

CROSS-REFERENCE TO RELATED APPLICATIONS; BENEFIT CLAIM

This application claims the benefit of Provisional Appln. 61/880,852, filed Sep. 21, 2013, the entire contents of which is hereby incorporated by reference as if fully set forth herein, under 35 U.S.C. §119(e).

FIELD OF THE INVENTION

The present invention relates to tracking which data items, in a set of data items, are valid at given points in time.

BACKGROUND

It is often useful to maintain two or more copies of the same information. For example, it is common for a primary copy of a data item to be stored on disk, and a cached copy of the data item to be stored in volatile memory. Accessing the cached copy of the data item is much faster than accessing the primary copy, so the cached copy is typically used to service read requests directed to the data item.

While maintaining multiple copies of a data item can significantly speed up the handling of read requests, handling write requests is another matter. For example, when multiple copies of a data item exist, one way to handle write requests directed to the data item would be to update every copy of the data item. Updating all copies of the data item would ensure that all copies remain up-to-date. Unfortunately, updating every copy of a data item is much less efficient than updating a single copy of the data item. The inefficiency of updating all copies of a data item is even worse when one or more of the copies is compressed and/or encrypted. Under these circumstances, making the update may involve decompressing data, making the update, and then recompressing the data.

As an alternative to updating all copies of a data item in response to an update request, it is possible to update fewer than all copies, and to keep track of which copies were updated. For example, assume that a primary copy of a data item is on disk, and a cached copy of the same data item resides in volatile memory. Further assume that the cached copy is compressed. Under these circumstances, the most efficient way to respond to an update to the data item may be to apply the update to the primary copy, and mark the cached copy as "invalid".

After a copy of a data item is marked invalid, that copy is no longer used to service read requests for the current version of the data item. Instead, handling a read request for the current version of the data item may involve accessing the primary copy of the data item on disk, and loading a new copy of the data item into volatile memory. Until invalidated, that new copy of the data item may then be used to service read requests for the current version of the data item.

Maintaining multiple copies of a data item becomes even more complicated when some read requests may be for past versions of the data item. Such requests are referred to herein as past-version requests. For example, a read request may be for the version of a data item that existed at a particular past point in time (T1). If a particular copy of the data item is marked "invalid", it is not possible to know whether that copy of the data item may be used to service the read request. Specifically, if that copy of the data item was marked invalid after time T1, then the copy may in fact be the exact version needed by the past-version request.

Based on the foregoing, it is desirable to provide a way to keep multiple copies of data items, invalidate those copies that become out-of-date, and yet be able to use those out-of-date copies, when possible, for read requests that specify past points in time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are provided for using bitmaps to indicate which items, in a set of items, are invalid. The bitmaps include an "active" bitmap and one or more "temporal clones". The active bitmap indicates which items in the set are currently valid. The temporal clones are outdated versions of the active bitmap that indicate which items in the set were invalid at previously points in time. For example, a temporal clone may have a "clone time" of T1, and therefore indicate which items in the set were invalid as of time T1. Similarly, a temporal clone having a clone time of T2 would indicate which items in the set were invalid as of time T2.

Temporal clones may not be very different from each other. For example, if only one item was invalidated between time T1 and time T2, the temporal clone for time T2 may only differ from the temporal close for time T1 by a single bit. Therefore, according to one embodiment, a bitmap is selected as the "base bitmap", and one or more other bitmaps are encoded using delta encoding. Run length encoding may then be applied to further compress the bitmap information.

While the examples are given herein as to how these techniques may be applied in an "in-memory-mirroring" environment in which relational data is stored in one format on disk, and in another format in volatile memory, the techniques may be applied in any situation in which one copy of a data item, within a set of items, is invalidated in response to updates made to another copy of the same data item.

IN-MEMORY-MIRRORING

Different data formats have different benefits. Therefore, techniques have been developed for maintaining data persistently in one format, but making that data available to a database server in more than one format. Such techniques are described, for example, in U.S. Provisional Application 61/880,852, filed Sep. 21, 2013, which has been incorporated herein by reference.

As explained in that Application, one of the formats in which the data is made available for query processing is based on the on-disk format, while another of the formats in which the data is made available for query processing is independent of the on-disk format. The format that corresponds to the on-disk format is referred to as the "persistent format" or "PF". Data that is in the persistent format is referred to herein as PF data. An in-memory format that is independent of the on-disk format is referred to as a "mirror format" or "MF". Data that is in the mirror format is referred to herein as MF data. For example, in one embodiment, the persistent format is row-major disk blocks, and the mirror format is a column-major format.

In an embodiment in which the MF data is compressed, the MF data may be organized, within volatile memory, into "in-memory compression units" (IMCUs). Each IMCU stores a different set of MF data.

The MF data is only useful if the MF data is kept up to date with all changes being made to the PF data. For example, if a query calls for the current values from column c1, then the MF data for column c1 can only be used if its values are current. In some situations, it is possible to directly update the MF data to reflect a change made by a transaction when the transaction commits. However, in other situations, it may be necessary to update the MF data implicitly. When updated implicitly, the MF data itself does not necessarily change, but metadata is stored to indicate that the values contained therein have been updated. As shall be described in greater detail hereafter, the metadata used to record implicit updates to the MF data may include journals and changed-row bitmaps.

JOURNALS

In some embodiments, keeping the MF data in sync with updates to the PF data is complicated by the fact that the MF data may be in a compressed format. For example, if a column vector is compressed, then directly updating a value within the column vector may require the entire column vector to be decompressed, the update performed, and then the entire column vector to be compressed again. It would not be efficient to perform such operations in response to every update performed on the PF data.

To reduce the amount of decompression and decompression operations required to keep the MF data in sync, one embodiment makes use of journals to make implicit updates to the MF data. In general, journals store information about updates (a) made to the PF data, and (b) not yet made directly to the MF data. Journals are described in detail in U.S. Provisional Application 61/880,852.

SNAPSHOT METADATA UNITS

Figure 1:
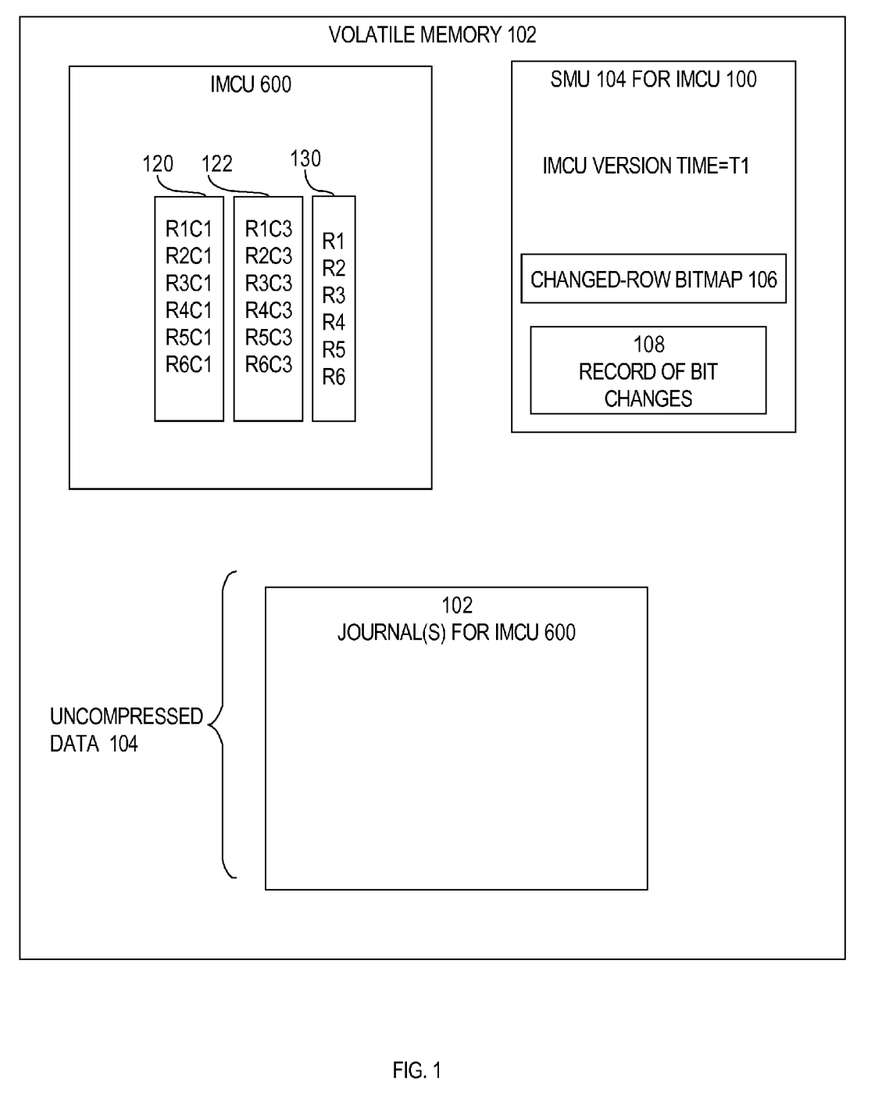
FIG. 1 is a block diagram illustrating an in-memory compression unit with it corresponding snapshot metadata unit, according to one embodiment.

As mentioned above, metadata is maintained for each IMCU. In one embodiment, a Snapshot Metadata Unit (SMU) is responsible for maintaining at least some of that metadata. Referring to FIG. 1, an IMCU 100 is illustrated with its corresponding SMU 104. The IMCU includes two column vectors 120 and 122. Column vector 120 contains values of the first six rows of a column c1. Column vector 122 contains values of the first six rows of a column c2.

In the illustrated embodiment, SMU 104 stores the IMCU version time and a changed-row bitmap 106. The IMCU version time is the time at which the values in the IMCU 100 were current. Changed-row bitmaps shall be described in greater detail hereafter.

Among other things, the SMU 104 for IMCU 100 captures all updates that affect the MF data contained in the IMCU. Consequently, the SMU for an IMCU may indicate, for example, whether the corresponding IMCU has valid values for a given rowid/snapshot-time combination. As another example, the SMU may generate a list of rowids of all rows for which the corresponding IMCU has invalid values, relative to a given snapshot-time. This list may then be used in conjunction with the rowid column vector to identify the rows for which values must be obtained from other sources (e.g. from journals or from the PF data).

CHANGED-ROW BITMAPS

In one embodiment, the updates captured by an SMU are indicated by a "changed-row bitmap" maintained within the SMU. Referring again to FIG. 1, the changed row bitmap 106 for IMCU 100 is maintained in SMU 104. A changed-row bitmap is a bitmap that indicates the rows (a) for which the corresponding IMCU has values, and (b) that have been changed by transactions that committed since the version timestamp of the IMCU.

For example, when a transaction performs an update to rows r1, r3 and r5, the SMU 104 for IMCU 100 updates the changed-row bitmap of IMCU 100 by setting the bits that correspond to rows r1, r3, and r5 because those are the updated rows that fall within the MF data of IMCU 100.

According to one embodiment, when a change is made to data that is mirrored in IMCU 100, the SMU 104 stores a record of which bits of the changed-row bitmap 106 were set, and when. These records are collectively represented in FIG. 1 as record of bit changes 108. For example, if an update made at time T1 modifies row r1, then the bit for row r1 would be set, and a record is stored to indicate that the bit for r1 was set at time T1.

According to one embodiment, the changed-row bitmap is created on an as-needed basis. For example, if the changed-row bitmap is to reflect whether a change has occurred to a million rows, a one million bit data structure is not proactively initialized. Instead, data is only stored for row ranges that have at least one bit set. For any range for which no data is stored, all bits are deemed to be "0".

Figure 2:
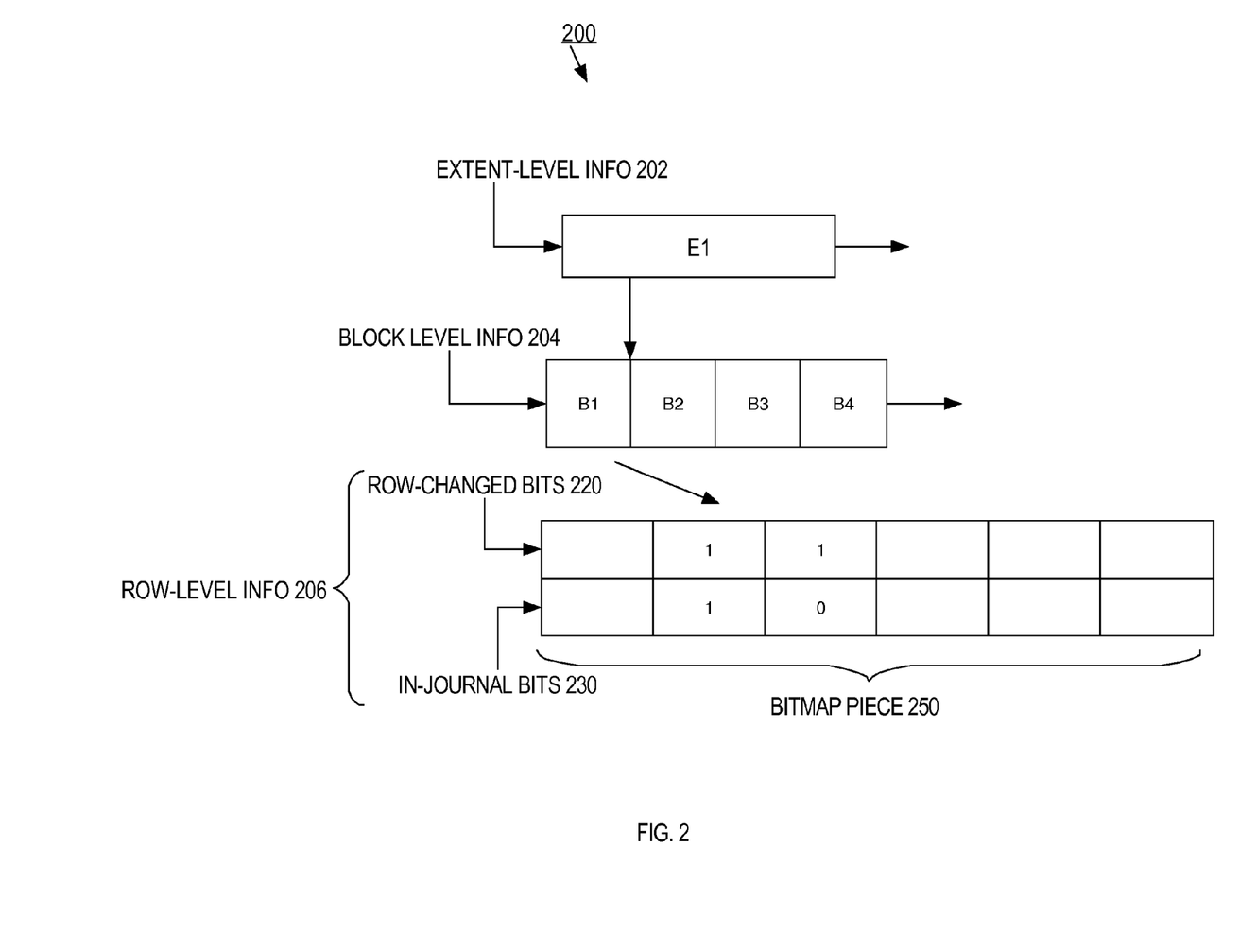
FIG. 2 is a block diagram of a structure that may be used for a changed-row bitmap, according to one embodiment.

Referring to FIG. 2, it illustrates a hierarchical structure 200 for representing a changed-row bitmap, according to one embodiment. In the illustrated embodiment, the hierarchical structure 200 has levels that correspond to extents, blocks, and rows. The extent-level information 202 includes a record for each extent in which there is any set bit. Extent-level records link to other extent-level records (not shown), thereby forming a linked list of records for the extents that have one or more set bits.

In addition, the extent records include a pointer to a linked list of block level information 204 for the blocks that reside in the extent. In the illustrated example, the record for extent E1 points to the record for blocks B1, B2, B3 and B4. The block-level record can be the first record in a linked list of block-level records for the blocks that belong to extent E1.

The block-level records, in turn, point to row-level information 206 stored in the form of bitmap pieces. Specifically, in the illustrated embodiment, the record for block B1 points to bitmap piece 250.

Each position in the bitmap piece 250 corresponds to a row whose data items are stored in block B1. In the illustrated embodiment, bitmap piece 250 has six bit positions, which correspond to six rows are stored in B1. For each bit position, bitmap piece 250 includes two bits, one of which is a row-changed bit 220 and the other of which is an in-journal bit 230. For any given row, the row-changed bit indicates that the row changed since data items for the row were stored in the IMCU. The in-journal bit for a row indicates whether the updated values for the row are stored in the IMCU's journal.

Based on the information in data structure 200, the database server may determine whether the current version of a data item resides in the IMCU, in the journals 102 of the IMCU, or in neither. Specifically, if the structure 200 has no information for a given row, then the IMCU has the current version of the data items from the row. The IMCU also has the current version of the data items from the row if the structure 200 has information for the row, and the row-changed bit for the row is "0". If structure 200 has information for the row, the row-changed bit is set and the in-journal bit is set, then the IMCU does not have the current version of the item, but the journal(s) 102 for the IMCU does have the current version of the item. Finally, if structure 200 has information for the row, the row-changed bit is set, and the in-journal bit is not set, then neither the IMCU nor the journals 102 have the current version of the data item, and the current version must be retrieved from the PF data.

The records of structure 200 are created on an as-needed basis. Thus, if the IMCU is current for all data items in a particular extent, then structure 200 may not have any records for the extent. Similarly, if the IMCU is current for all data items in a particular block, then structure 200 may not have any block level information 204 for that block. By only storing changed-row information for extents/blocks that have been changed or added since the version time of the IMCU, structure 200 may be significantly small than it would otherwise be if bits were pre-allocated for every row.

USING THE RECORD OF BIT CHANGES

For a transaction that requires the most recent version of data items, a set bit in the changed-row bitmap 106 indicates that the MF data has stale data for that row, and therefore the IMCU 100 cannot be used to supply data from that row. However, not all transactions require the most recent version of data items.

For example, in many database systems, transactions are assigned a snapshot time, and return data that reflects the state of the database as of that snapshot time. Specifically, if a transaction is assigned a snapshot time of T3, then the transaction must be provided versions of data items that include all changes that were committed before T3, and no changes that were not committed as of T3 (except for changes that the transaction makes itself). For such transactions, a set bit in the changed-row bitmap 106 does not necessarily indicate that the IMCU 100 cannot be used to be the source for items for the corresponding row. Specifically, such transactions may still use the IMCU 100 to obtain data for a particular row, even though the bit for that row is set in changed-row bitmap 106, if the bit was first set after the snapshot time of the transaction.

For example, assume that the column vectors 120 and 122 contain data as it existed at time T1, as indicated by the IMCU version time stored in SMU 104. At a later time T5, an update operation changes row r1. Specifically, the update changes the value of r1c1 for X to Y. In response to this update, the changed-row bitmap 106 of IMCU 100 would change from 000000 to 100000, setting the bit that corresponds to row r1 to "1". In addition, a record is stored within SMU 104 indicating the bit for r1 was changed at T5.

At yet a later time T9, another update operation changes row r3. Specifically, the second update changes the value of r2c3 from A to B. In response to this update, the changed-row bitmap 106 of IMCU 100 would change from 100000 to 101000, setting the bit that corresponds to row r3 to "1". In addition, a record is stored within SMU 104 indicating that the bit for row r3 was set at time T9.

After these updates have occurred, the database server may execute a transaction that reads the values of columns c1 and c3. If the snapshot time of the transaction is earlier than T5, then the transaction may read, from column vectors 120 and 122, all the values the transaction requires. The database may determine this by comparing the snapshot time of the transaction to the times indicated in the record of bit changes 108. If the snapshot time of the transaction is after the IMCU version time, but before any times in the record of bit changes 108, than all values in the IMCU 100 are valid relative to that transaction.

If the snapshot time of the transaction is after T5 but before T9, then the transaction may read all values from column vectors 120 and 122 except the values from row r1, which must be obtained elsewhere (e.g. from a journal or from the PF data). If the snapshot time of the transaction is after T9, then the transaction may read all values from column vectors 120 and 122 except the values from rows r1 and r3, which must be obtained elsewhere.

DELETE VECTORS

In one embodiment, to account for the snapshot time of transactions that read values that are mirrored in IMCU 100, the changed-row bitmap 106 is used in conjunction with the record of bit changes 108 to create a delete vector for each transaction that seeks to read data from IMCU 100. A delete vector is snapshot-time specific, because bits in the delete vector are only set for rows that were updated before the snapshot-time associated with the transaction for which the delete vector is constructed. Stated another way, each delete vector reflects the version of the changed-row bitmap that was current as of the snapshot-time. Thus, the older the snapshot-time associated with a delete vector, the older the version of the changed-row bitmap the delete vector reflects, and thus fewer the number of bits that will be set in the delete vector.

For a transaction with a snapshot time after the version time of the IMCU, a delete vector is made for the transaction by "rolling back" changes that occurred to the changed-row bitmap 106 after the snapshot-time of the transaction. For example, if a transaction has a snapshot time of T5, the database server searches the record of bit changes 108 to identify changes that occurred after time T5. A copy of the changed-row bitmap 106 is made, and within that copy the bits that correspond to the changes that occurred after time T5 are reset to "0". For transactions with snapshot times before the version time of the IMCU, the delete vector may be generated by making a copy of the changed-row bitmap 106, and within that copy setting to "1" the bits of rows that were changed between the snapshot time of the query and the version time of the IMCU.

Because delete vectors are transaction-specific, at any given time, multiple distinct transactions may be performing scans of the rows that map to a particular IMCU. Each of those transactions may have been assigned a different snapshot-time. Consequently, each of the transactions will have a different delete vector, though all of the delete vectors are generated based on the same changed-row bitmap of the SMU that corresponds to the IMCU.

POST-MERGE RETENTION OF PRE-MERGE CHANGED-ROW BITMAPS

When changes are merged into an IMCU, all values in the changed-row bitmap of the IMCU are reset to "0" to indicate that no rows have been changed since the new version time of the IMCU (which will be the time at which the IMCU is refreshed/merged). However, rather than simply discard or overwrite the existing changed-row bitmap, a copy of the pre-merge changed-row bitmap may be saved. A saved copy of a pre-merge changed-row bitmap is referred to herein as a "retained bitmap". Each retained bitmap is associated with a pre-merge version IMCU. Each retained bitmap has a "retained bitmap time", which is the snapshot time of the associated pre-merge version of the IMCU. As shall be described in greater detail hereafter, such retained bitmaps allow a post-merge IMCU to be used to provide data items to transactions that have snapshot times before the merge.

For example, assume that an IMCU is constructed at time T1. From time T1 to time T10, the changes made to the data items in the IMCU are recorded in a journal (e.g. in a "global journal" of the IMCU) rather than being made directly to the data items themselves within the IMCU. While those changes are being recorded within the journal, the changes are also causing corresponding bits to be set in the changed-row bitmap of the IMCU. At time T10, the changes are merged into the IMCU, causing the version time of the IMCU to change from T1 to T10.

Under these circumstances, the state of the changed-row bitmap immediately before the merger reflects which rows, within the IMCU had changed between time T1 and time T10. By indicating which rows had changed between time T1 and time T10, the changed-row bitmap likewise indicates which rows had not changed between time T1 and time T10. Within the post-merger IMCU, those rows that had not changed between time T1 and time T10 can be provided to transactions that have snapshot times between T1 and T10.

Specifically, a copy of the pre-merge version of the changed-row bitmap is retained after the merger. Along with the retained bitmap, the version timestamp of the pre-merge IMCU is also stored. In the example given above, the retained bitmap would be associated with the version timestamp of T1.

When a transaction (a) requires data items that map to an IMCU, and (b) has a snapshot time that falls between the retained bitmap time and the current IMCU time, the retained bitmap is used to identify the rows that were not changed between the retained bitmap time and the current IMCU time. Values for the identified rows may be provided to the transaction from the current IMCU. Values for the remaining rows are obtained elsewhere. Specifically, values for the remaining rows may be obtained from the global journal of the IMCU if the relevant journal entries have not yet been purged, or from the PF data.

IMCU REFRESH UNDO

Rather than store a single retained bitmap in response to the most recent merge, a separate retained bitmap may be stored in response to each merge. The retained bitmaps for a given IMCU may be linked in chronological order. The linked set of retained bitmaps for an IMCU constitutes an "IMCU refresh undo" for the IMCU.

For example, assume that an IMCU was created at time T1, and then refreshed/merged at times T10, T15 and T30. Under these circumstances, the IMCU refresh undo for the IMCU would contain three retained bitmaps RB1, RB2 and RB3. These three retrained bitmaps would be associated with times T1, T10 and T15, respectively.

In the present example, the "0" bits of RB1 indicate the rows that were not changed between times T1 and T10. The "0" bits of RB2 indicate the rows that were not changed between the times T10 and T15. The "0" bits of RB3 indicate the rows that were not changed between the times T15 and T30.

Given any snapshot time, the IMCU refresh undo may be used to identify which rows, within the current IMCU can be provided to a transaction with that snapshot time. For example, for a transaction with the snapshot time T18, the "0" bits in RB3 would indicate which rows can be provided to the transaction from the current IMCU. As another example, for a transaction with the snapshot time of T12, RB2 and RB3 can be combined using a logical OR operation to produce a bitmap that indicates which rows can be provided to the transaction from the current IMCU. As yet another example, for a transaction with the snapshot time of T5, RB1, RB2 and RB3 can be combined using a logical OR operation to produce a bitmap that indicates which rows can be provided to the transaction from the current IMCU.

Thus, given a transaction with the snapshot time of TX, the retained bitmap with the highest timestamp that is below TX is combined, using a logical OR operation, with all more recent retained bitmaps of the same IMCU. The logical "OR" operation produces a bitmap where the "0"s correspond to rows that have not changed since TX and the version time of the current IMCU. Consequently, data items for those rows may be provided by the IMCU.

MAINTAINING SYNC WITHOUT JOURNALS

In the sections above, it is explained that the MF data may be kept in sync with the PF data by recording changes in journals, while leaving the compressed MF data intact until the journals are merged into the compressed MF data. However, in an alternative embodiment, for one or more of the IMCUs, the MF data may be maintained in sync merely by invalidating the data in response to changes made to the corresponding PF data without using journals to record the changes.

In such an embodiment, delete vectors may be generated for a transaction, as described above. For those bits that are not set, the data may be obtained from the appropriate IMCU. For those bits that are set, the data must be retrieved from the PF data, since obtaining data from in-memory journals is not an option when no such journals are maintained.

The benefit of invalidating the MF data without recording the changes in journals is that the processing overhead and memory consumption of maintaining the journals is avoided. However, when data items in the IMCU are too stale to be used to process a transaction, accessing the appropriate version of the data items from the PF data will generally incur more overhead than would be required to obtain the data items from journals. In addition, refreshing the IMCUs in the absence of in-memory journals will also typically incur more overhead, because the changes that need to be merged into the IMCUs must be obtained from the PF data rather than from in-memory journals.

In some embodiments, journals may be maintained for some IMCUs, but not others. In addition, it is possible for the journal of an IMCU to be dropped, and yet continue to use the IMCU for data that has not been invalidated due to changes between the IMCU version time and the snapshot time of the transactions that require the data.

TEMPORAL CLONES

As mentioned above, delete vectors may be constructed on-the-fly on a per-transaction basis. The delete vector for a transaction indicates which rows in the IMCU are valid as of the snapshot time of the transaction. According to one embodiment, rather than construct a delete vector on-the-fly for each transaction based on the changed-row bitmap 106 and the record of bit changes 108, temporal clones of the changed-row bitmap 106 may be maintained and used by the transactions.

Specifically, according to one embodiment, many copies of the changed-row bitmap of the same IMCU are concurrently maintained in volatile memory. The copies of the changed-row bitmap that reflect past points in time are referred to herein as "temporal clones". Each temporal clone has a unique temporal identity, referred to herein as the "clone time" of the temporal clone. When a database server receives a past-version request from a transaction, the database server determines which rows within an IMCU are valid as of the snapshot time of the past-version request by locating the temporal clone whose clone time matches the snapshot time. The temporal clone thus identified may be used to determine which rows within the IMCU can be used to answer the past-version request without having to incur the additional overhead of constructing a delete vector.

In one embodiment, even if no temporal clone exactly matches the snapshot time of the past-version request, the database server finds the temporal clone with the closest clone time, and constructs the delete vector based on that temporal clone (rather than the current changed-row bitmap). In these situations, the overhead incurred by generating a delete vector based on the closest temporal clone may be significantly less than the overhead that would have been incurred by generating a delete vector based on the current changed-row bitmap.

Unlike delete vectors, temporal clones are not limited to use with a single past-version request, nor to past-version requests from a single transaction. Rather, the same temporal clone may be used to process any past-version request that executes with the same scan environment (e.g. with the same snapshot time). Further, temporal clones need not be updated, since they reflect a past state (and the past state will not change over time). Therefore, the temporal clones may be designated as "read-only". Since the temporal clones are read-only, the concurrency control used to govern access to the temporal clones is relatively simple.

TEMPORAL CLONE COMPRESSION

It is desirable to have the temporal clones occupy as little space as possible, particularly in embodiments where temporal clones are maintained in volatile memory. Therefore, according to one embodiment, some or all of the temporal clones are stored in a compressed format. The compression may be performed on each temporal clone individually, performed based on differences between temporal clones, or both. As an example of an embodiment in which both types of compression are applied, the compression may involve:
   selecting a version of the changed-row bitmap to serve as the "base bitmap"
   encoding each subsequent bitmap using delta encoding (i.e. based on the differences between the bitmap and the immediately preceding bitmap)
   performing run length compression on the results produced by the delta encoding It should be noted that the compression performed in this example is merely one of many ways the temporal clones may be compressed. The approaches described herein are not limited to any particular type or sequence of compression techniques.

USAGE SCENARIOS

In the preceding description, embodiments were described in which temporal clones are used to quickly identify which rows, within an IMCU, are invalid for a past-version request that is being executed by a database server. However, the techniques described herein are not limited to that context. Specifically, a changed-item bitmap, combined with temporal clones of that bitmap, may be used on any context in which:
   items, within a set of items, are invalidated; and
   it is necessary to determine which items in the set are valid relative to past points in time Thus, the techniques are applicable outside the context of IMCUs and database systems. For example, an operating system on a first computer may maintain, in volatile memory, data that indicates which files on a second computer have been deleted. Temporal clones of that data may be maintained using the techniques described herein so that an administrator is able to see which files existed on that second computer at any particular point in time.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
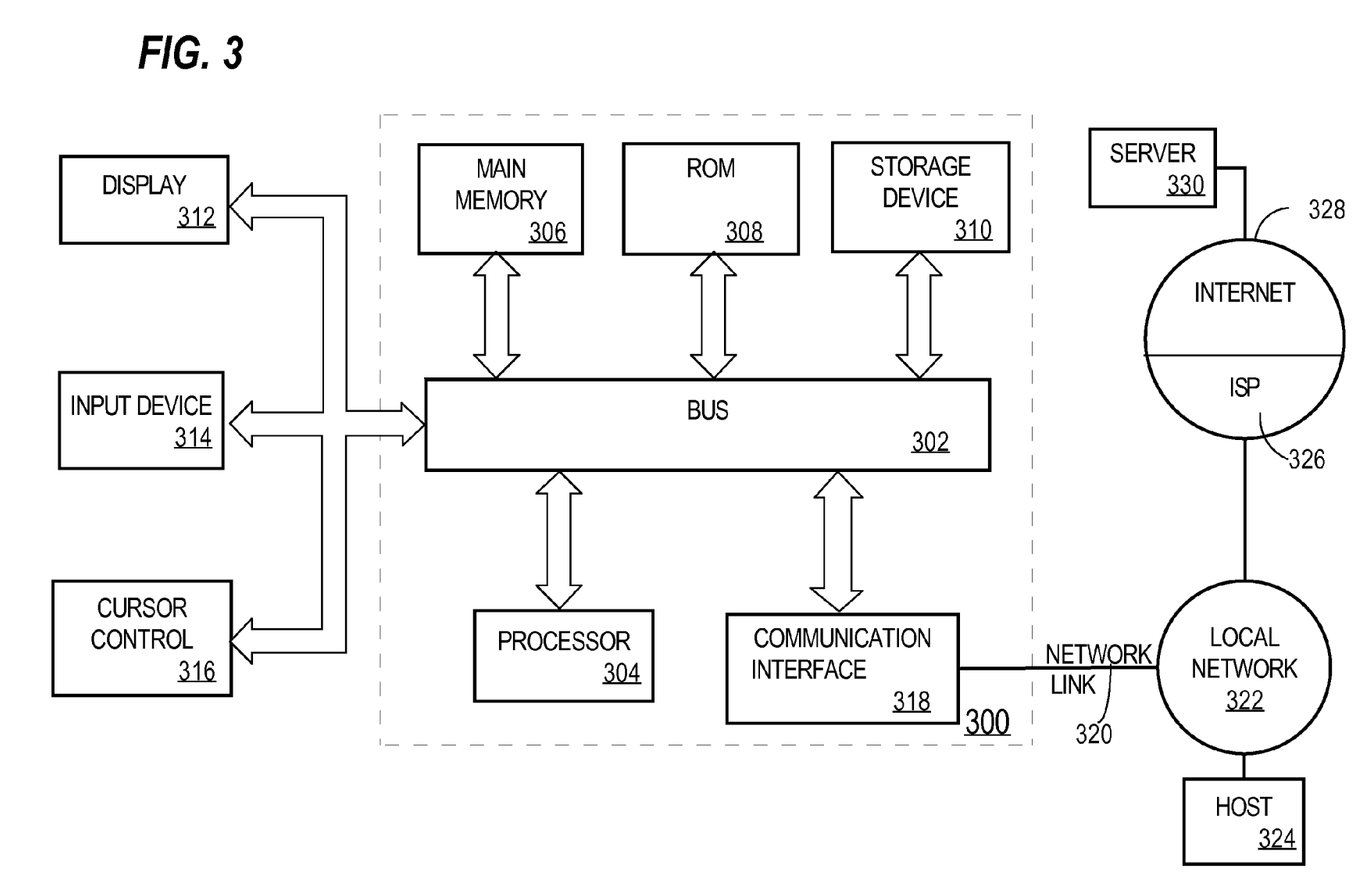
FIG. 3 is a block diagram of a computer system that may be used to execute the techniques described herein, according to one embodiment.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
maintaining both primary copies and cached copies of a plurality of items;
maintaining, in volatile memory, particular invalidity data that indicates which items in a set of items are invalid;
wherein the set of items whose invalidity is indicated by the particular invalidity data are the cached copies of the plurality of items;
wherein the particular invalidity data is associated with a current time;
wherein each item indicated as being invalid in the particular invalidity data is an out-of-date copy of an item, wherein the out-of-date copy became out-of-date as a result of one or more updates that were made to the primary copy of the item before the current time;
generating a plurality of temporal clones of said particular invalidity data;
wherein each temporal clone:
has a respective clone time;
indicates which items in the set of items were invalid as of the clone time of the temporal clone;
wherein each item indicated as being invalid in each temporal clone is an out-of-date copy of an item, wherein the out-of-date copy became out-of-date as a result of one or more updates that were made to the primary copy of the item before the respective clone time of the temporal clone;
receiving a past-version request that requires a determination of which items, within the set of items, were valid as of a particular time that is before the current time;
selecting a particular temporal clone based on comparisons between the particular time and the respective clone times of the plurality of clones; and
determining which items, within the set of items, were valid as of the particular time based, at least in part, on the particular temporal clone;
wherein the method is performed by one or more computing devices.

2. The method of claim 1 wherein selecting the particular temporal clone is performed by selecting a temporal clone with a respective clone time that matches the particular time.

3. The method of claim 1 wherein:
selecting the particular temporal clone is performed by selecting a temporal clone with a respective clone time that is close to but does not match the particular time; and
the method further comprises modifying the temporal clone to reflect the state of the particular invalidity data as of the particular time.

4. The method of claim 1 wherein the particular invalidity data is a bitmap, wherein each bit in the bitmap indicates whether a corresponding item in the set of items is valid.

5. The method of claim 1 further comprising compressing the plurality of temporal clones to create a compressed version of the temporal clones, wherein the compressed version of the temporal clones is pre-computed and stored in the volatile memory prior to receiving the past-version request.

6. The method of claim 5 wherein compressing the plurality of temporal clones includes selecting a given temporal clone as a base temporal clone and performing delta encoding on the temporal clones, from the plurality of temporal clones, other than the base temporal clone.

7. The method of claim 6 wherein compressing the plurality of temporal clones further comprises, after performing delta encoding, performing run-length compression to further compress the plurality of temporal clones.

8. The method of claim 1 wherein the set of items are rows contained in an in-memory compression unit.

9. The method of claim 8 wherein the in-memory compression unit is compressed, and contains an in-memory copy of items that are stored on non-volatile memory.

10. The method of claim 9 wherein the in-memory compression unit stores the items in a column-major format and the items are stored on disk in a row-major format.

11. One or more non-transitory computer-readable media storing instructions which, when executed by one or more computing devices, causes performance of a method comprising:
maintaining both primary copies and cached copies of a plurality of items;
maintaining, in volatile memory, particular invalidity data that indicates which items in a set of items are invalid;
wherein the set of items whose invalidity is indicated by the particular invalidity data are the cached copies of the plurality of items;
wherein the particular invalidity data is associated with a current time;
wherein each item indicated as being invalid in the particular invalidity data is an out-of-date copy of an item, wherein the out-of-date copy became out-of-date as a result of one or more updates that were made to the primary copy of the item before the current time;
generating a plurality of temporal clones of said particular invalidity data;
wherein each temporal clone:
has a respective clone time;
indicates which items in the set of items were invalid as of the clone time of the temporal clone;
wherein each item indicated as being invalid in each temporal clone is an out-of-date copy of an item, wherein the out-of-date copy became out-of-date as a result of one or more updates that were made to the primary copy of the item before the respective clone time of the temporal clone;
receiving a past-version request that requires a determination of which items, within the set of items, were valid as of a particular time that is before the current time;
selecting a particular temporal clone based on comparisons between the particular time and the respective clone times of the plurality of clones; and
determining which items, within the set of items, were valid as of the particular time based, at least in part, on the particular temporal clone.

12. The one or more non-transitory computer-readable media of claim 11 wherein selecting the particular temporal clone is performed by selecting a temporal clone with a respective clone time that matches the particular time.

13. The one or more non-transitory computer-readable media of claim 11 wherein:
selecting the particular temporal clone is performed by selecting a temporal clone with a respective clone time that is close to but does not match the particular time; and
the method further comprises revising the temporal clone to reflect the state of the particular invalidity data as of the particular time.

14. The one or more non-transitory computer-readable media of claim 11 wherein the particular invalidity data is a bitmap, wherein each bit in the bitmap indicates whether a corresponding item in the set of items is valid.

15. The one or more non-transitory computer-readable media of claim 11, wherein the method further comprises compressing the plurality of temporal clones to create a compressed version of the temporal clones, wherein the compressed version of the temporal clones is pre-computed and stored in the volatile memory prior to receiving the past-version request.

16. The one or more non-transitory computer-readable media of claim 15 wherein compressing the plurality of temporal clones includes selecting a given temporal clone as a base temporal clone and performing delta encoding on the temporal clones, from the plurality of temporal clones, other than the base temporal clone.

17. The one or more non-transitory computer-readable media of claim 16 wherein compressing the plurality of temporal clones further comprises, after performing delta encoding, performing run-length compression to further compress the plurality of temporal clones.

18. The one or more non-transitory computer-readable media of claim 11 wherein the set of items are rows contained in an in-memory compression unit.

19. The one or more non-transitory computer-readable media of claim 18 wherein the in-memory compression unit is compressed, and contains an in-memory copy of items that are stored on non-volatile memory.

20. The one or more non-transitory computer-readable media of claim 19 wherein the in-memory compression unit stores the items in a column-major format and the items are stored on disk in a row-major format.

* * * * *

UNITED STATES PATENT AND TRADEMARK OFFICE
CERTIFICATE OF CORRECTION

PATENT NO. : 9,639,468 B2  
APPLICATION NO. : 14/506613  
DATED : May 2, 2017  
INVENTOR(S) : Raja et al.

Page 1 of 1

It is certified that error appears in the above-identified patent and that said Letters Patent is hereby corrected as shown below:

On the Title Page

On page 2, Column 2, under Other Publications, Line 2, delete "-Colomn" and insert -- -Column --, therefor.

In the Specification

In Column 10, Line 14, after "encoding" insert -- . --.

In Column 10, Line 33, after "time" insert -- . --.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*